J. CARMEAN.
Mowing-Machiness.

No. 147,224.　　　　　　　　　　Patented Feb. 3, 1874.

Witnesses.
Inventor.
John Carmean
by Charles E. Bishop
his Atty

UNITED STATES PATENT OFFICE.

JOHN CARMEAN, OF MARSHALL, MISSOURI.

IMPROVEMENT IN MOWING-MACHINES.

Specification forming part of Letters Patent No. 147,224, dated February 3, 1874; application filed December 17, 1873.

*To all whom it may concern:*

Be it known that I, JOHN CARMEAN, of Marshall, in the county of Saline and State of Missouri, have invented certain Improvements in Hemp-Mowing Machines, of which the following is a specification:

My invention relates to harvesting-machines, more particularly such as are used for mowing hemp; and consists in certain improvements in the construction of the same, and novel combination of parts, as hereinafter shown and described, the principal features of the invention being a wheel made fast to and revolving with the axle of the vehicle, said wheel being provided with lugs on each side near the periphery, and a series of levers, so constructed and arranged as to be actuated by the lugs descending as the wheel revolves, and cause a uniform and rapid oscillating movement of the bar or rod to which the cutting-blade is attached.

Figure 1:
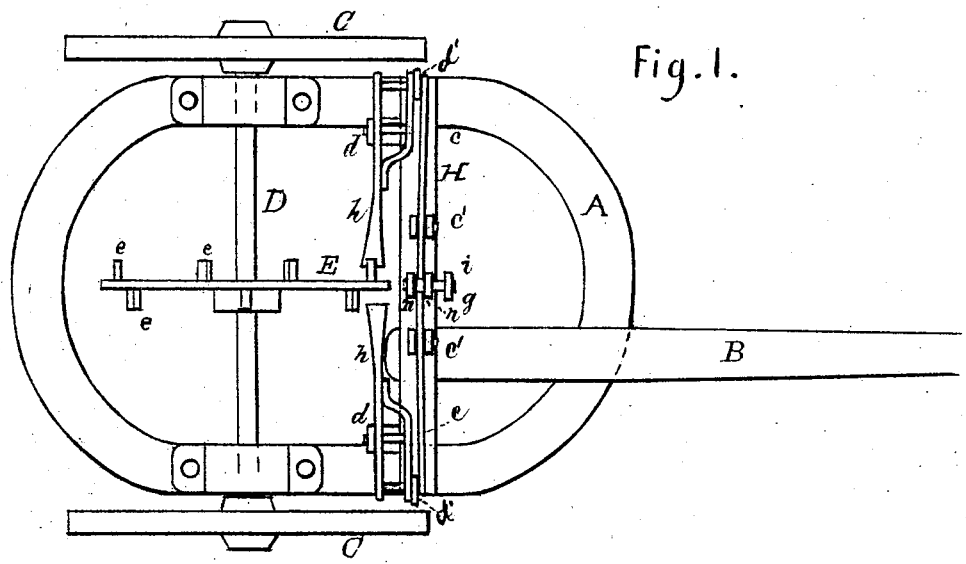
Figure 2:
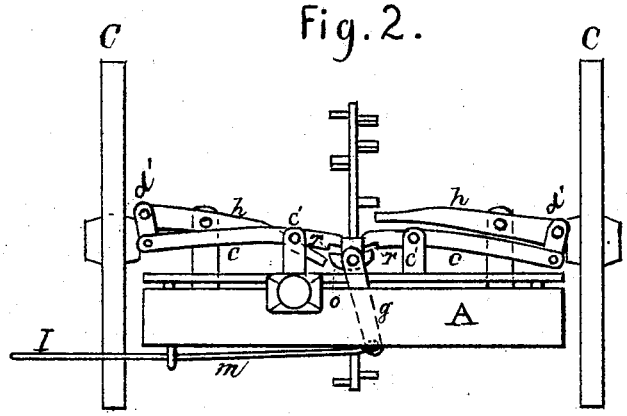

In the accompanying drawing, which illustrates my invention, and forms a part of the specification thereof, Figure 1 is a plan view, and Fig. 2 is a front view, of my improved hemp-mowing machine.

My invention is described as follows:

In the drawing referred to, A designates the frame of the machine, with the tongue B and wheels C, one or both of the latter being made fast to the axle D. Rigidly attached to the said axle, at the center thereof, is the wheel E, provided with the lugs $e$ on both sides, near the periphery thereof. H designates a bar or platform upon and extending across the frame A, and supporting the mechanism operated by wheel E. $h$ indicates two levers, which are pivoted to the supports $d$, and extend inwardly toward wheel E, so that their inward extremities are caught by the lugs $e$ as said wheel revolves. The said levers are also hinged or connected at their outer extremities, by the pieces $d'$, to the levers $c$, the latter being pivoted to the supports $c'$. $g$ indicates a small bar, extending downwardly, to the upper end of which is fastened the pin or pivot $i$, passing through apertures in the supports $n$. $o$ designates a catch of the form shown, also fastened to pivot $i$, and working between the supports $n$. The inward extremities of levers $c$ have the notches $r$, which receive the angles of the piece $o$ when operated by the said levers. $m$ designates a bar or rod connecting with the lower end of the bar $g$, and to which is attached the cutting-blade I.

The lugs are so arranged upon wheel E as to strike the levers $h$ alternately as the wheel revolves; and the said levers are formed, as shown, suitably to receive the downward pressure of the lugs.

In operation, the axle D revolves with the forward movement of the vehicle and causes the wheel E to revolve, it being made fast thereto. The lugs $e$, striking the ends of levers $h$, press them downward alternately, which, through levers $c$, causes the oscillating movement of the catch $o$, bar $g$, and bar or rod $m$, to which is attached the cutting-blade.

Having thus described the construction and operation of my invention, I claim as new and desire to secure by Letters Patent—

In a mowing or harvesting machine, the combination of wheel E, provided with lugs $e$, levers $h$ and $c$, catch $o$, bar $g$, and rod $m$, constructed and operating as described.

Witness my signature hereto in the presence of two witnesses.

JOHN CARMEAN.

Witnesses:
    B. E. VANCE,
    J. R. VANCE.